US012649289B2

(12) United States Patent
Matsen et al.

(10) Patent No.: US 12,649,289 B2
(45) Date of Patent: Jun. 9, 2026

(54) THERMOPLASTIC BRAIDING FOR THE MANUFACTURE OF COMPOSITE ARTICLES

(71) Applicant: The Boeing Company, Arlington, VA (US)

(72) Inventors: Marc R. Matsen, Seattle, WA (US); Jeffery Lee Marcoe, Bellevue, WA (US); Gwendolyn Marie Janda, Seattle, WA (US)

(73) Assignee: The Boeing Company, Arlington, VA (US)

( * ) Notice: Subject to any disclaimer, the term of this patent is extended or adjusted under 35 U.S.C. 154(b) by 294 days.

(21) Appl. No.: 18/499,107

(22) Filed: Oct. 31, 2023

(65) Prior Publication Data

US 2025/0115008 A1 Apr. 10, 2025

Related U.S. Application Data

(60) Provisional application No. 63/588,955, filed on Oct. 9, 2023.

(51) Int. Cl.
B29C 70/08 (2006.01)
B29C 70/24 (2006.01)
(Continued)

(52) U.S. Cl.
CPC .............. B29C 70/08 (2013.01); B29C 70/24 (2013.01); B29C 70/302 (2021.05); B29C 70/34 (2013.01);
(Continued)

(58) Field of Classification Search
CPC ....... B29C 70/08; B29C 70/302; B29C 70/24; B29C 70/34
See application file for complete search history.

(56) References Cited

U.S. PATENT DOCUMENTS 5,419,231 A * 5/1995 Earle, III .............. B29C 53/665
87/9
5,575,875 A * 11/1996 Brittingham ........... A63B 60/00
156/169

(Continued)

FOREIGN PATENT DOCUMENTS

| DE | 102011119245 A1 | 10/2012 |
| EP | 3040181 A1 | 7/2016 |
| WO | 2012014613 A1 | 2/2012 |

OTHER PUBLICATIONS

European Patent Office, Extended European Search Report Issued in Application No. 24192064.4, Jan. 30, 2025, 9 pages.

*Primary Examiner* — Andrew D Graham
(74) *Attorney, Agent, or Firm* — Alleman Hall LLP

(57) ABSTRACT

A method of manufacturing a composite article comprises forming a braided lay-up including one or more braided layers around a braiding mandrel along at least a portion of a longitudinal axis of the braiding mandrel. Each braided layer may be formed by braiding tape segments of a fiber-reinforced thermoplastic resin tape applied at a tape tow orientation with thread segments applied at a thread tow orientation that is biased at an angle relative to the tape tow orientation. In an example, the thread segments include a thermoplastic resin thread that is integrated into a consolidated form of the braided lay-up following a consolidation process. In another example, the thread segments include a metallic thread that is removed from the braided lay-up prior to consolidation.

20 Claims, 10 Drawing Sheets

(51) Int. Cl.
    B29C 70/30        (2006.01)
    B29C 70/34        (2006.01)
    D04C 1/02         (2006.01)
    D04C 1/06         (2006.01)
    B29K 305/00           (2006.01)
    B29L 31/30            (2006.01)
(52) U.S. Cl.
    CPC ................ D04C 1/02 (2013.01); D04C 1/06
        (2013.01); *B29K 2305/00* (2013.01); *B29L*
        *2031/3076* (2013.01); *D10B 2505/12* (2013.01)

(56)                References Cited

U.S. PATENT DOCUMENTS 5,633,074  A  *   5/1997  Muroi ................... B29C 70/222
                                                        428/36.1
    6,250,193  B1 *   6/2001  Head ....................... D04C 1/06
                                                            87/8

| | | | | |
|---|---|---|---|---|
| 9,981,421 | B2 * | 5/2018 | Marcoe ................. | F03G 7/0614 |
| 2004/0247866 | A1 * | 12/2004 | Jensen .................... | E04H 12/00 |
| | | | | 428/364 |
| 2005/0258575 | A1 * | 11/2005 | Kruse .................... | B29C 70/32 |
| | | | | 264/573 |
| 2007/0193439 | A1 | 8/2007 | Gessler et al. | |
| 2012/0237707 | A1 * | 9/2012 | Beraud ................ | D03D 15/267 |
| | | | | 428/36.3 |
| 2014/0102578 | A1 * | 4/2014 | Bartel ................... | B29C 70/205 |
| | | | | 138/123 |
| 2015/0321441 | A1 * | 11/2015 | Marcoe ................... | D04C 1/06 |
| | | | | 156/149 |
| 2016/0016355 | A1 * | 1/2016 | Marcoe ................... | B29C 70/32 |
| | | | | 60/527 |
| 2017/0066209 | A1 * | 3/2017 | Hyson ................... | B29C 61/025 |
| 2017/0087745 | A1 * | 3/2017 | Cawthorne .............. | B32B 3/02 |
| 2018/0079156 | A1 * | 3/2018 | Klimovski ........... | B29C 70/443 |
| 2020/0139643 | A1 * | 5/2020 | Ogale .................... | B29C 53/84 |
| 2020/0139645 | A1 * | 5/2020 | Ogale .................... | B29C 53/60 |
| 2021/0001567 | A1 * | 1/2021 | Ogale .............. | B29C 66/72141 |

* cited by examiner

Figure 8A:
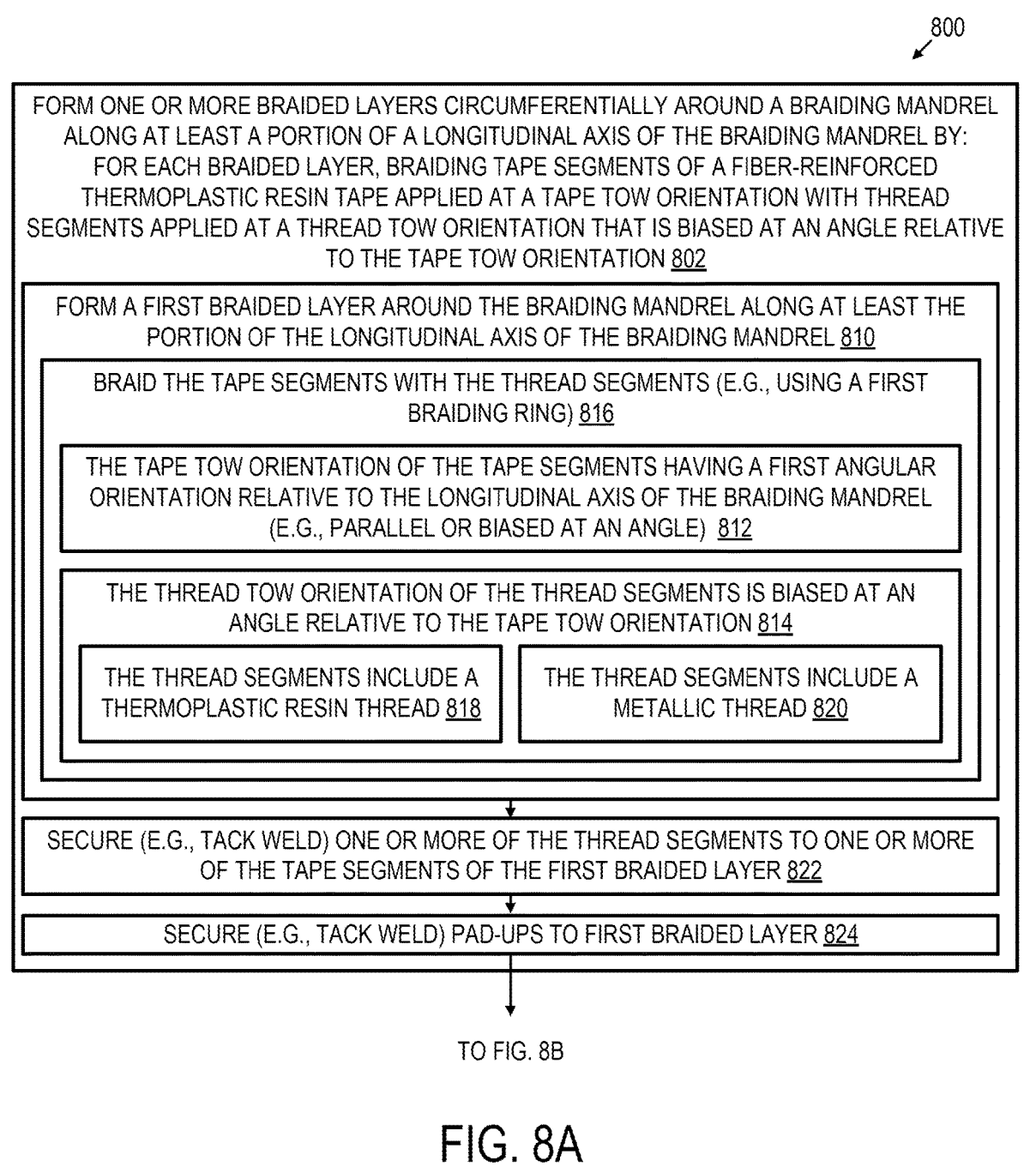

800

FORM ONE OR MORE BRAIDED LAYERS CIRCUMFERENTIALLY AROUND A BRAIDING MANDREL ALONG AT LEAST A PORTION OF A LONGITUDINAL AXIS OF THE BRAIDING MANDREL BY: FOR EACH BRAIDED LAYER, BRAIDING TAPE SEGMENTS OF A FIBER-REINFORCED THERMOPLASTIC RESIN TAPE APPLIED AT A TAPE TOW ORIENTATION WITH THREAD SEGMENTS APPLIED AT A THREAD TOW ORIENTATION THAT IS BIASED AT AN ANGLE RELATIVE TO THE TAPE TOW ORIENTATION 802

FORM A FIRST BRAIDED LAYER AROUND THE BRAIDING MANDREL ALONG AT LEAST THE PORTION OF THE LONGITUDINAL AXIS OF THE BRAIDING MANDREL 810

BRAID THE TAPE SEGMENTS WITH THE THREAD SEGMENTS (E.G., USING A FIRST BRAIDING RING) 816

THE TAPE TOW ORIENTATION OF THE TAPE SEGMENTS HAVING A FIRST ANGULAR ORIENTATION RELATIVE TO THE LONGITUDINAL AXIS OF THE BRAIDING MANDREL (E.G., PARALLEL OR BIASED AT AN ANGLE) 812

THE THREAD TOW ORIENTATION OF THE THREAD SEGMENTS IS BIASED AT AN ANGLE RELATIVE TO THE TAPE TOW ORIENTATION 814

THE THREAD SEGMENTS INCLUDE A THERMOPLASTIC RESIN THREAD 818

THE THREAD SEGMENTS INCLUDE A METALLIC THREAD 820

SECURE (E.G., TACK WELD) ONE OR MORE OF THE THREAD SEGMENTS TO ONE OR MORE OF THE TAPE SEGMENTS OF THE FIRST BRAIDED LAYER 822

SECURE (E.G., TACK WELD) PAD-UPS TO FIRST BRAIDED LAYER 824

FROM FIG. 8A                                         800

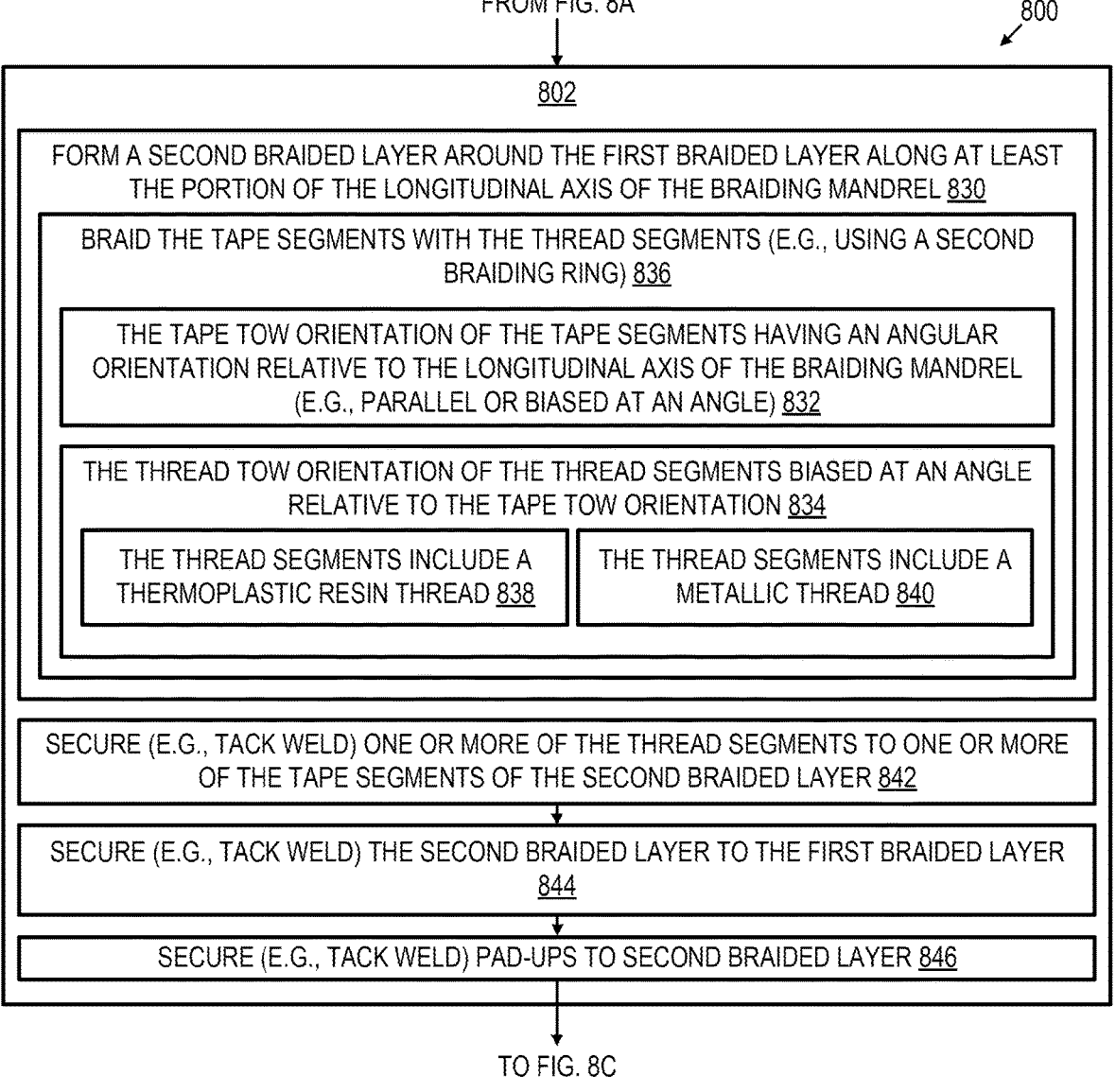

802

FORM A SECOND BRAIDED LAYER AROUND THE FIRST BRAIDED LAYER ALONG AT LEAST THE PORTION OF THE LONGITUDINAL AXIS OF THE BRAIDING MANDREL 830

BRAID THE TAPE SEGMENTS WITH THE THREAD SEGMENTS (E.G., USING A SECOND BRAIDING RING) 836

THE TAPE TOW ORIENTATION OF THE TAPE SEGMENTS HAVING AN ANGULAR ORIENTATION RELATIVE TO THE LONGITUDINAL AXIS OF THE BRAIDING MANDREL (E.G., PARALLEL OR BIASED AT AN ANGLE) 832

THE THREAD TOW ORIENTATION OF THE THREAD SEGMENTS BIASED AT AN ANGLE RELATIVE TO THE TAPE TOW ORIENTATION 834

THE THREAD SEGMENTS INCLUDE A THERMOPLASTIC RESIN THREAD 838

THE THREAD SEGMENTS INCLUDE A METALLIC THREAD 840

SECURE (E.G., TACK WELD) ONE OR MORE OF THE THREAD SEGMENTS TO ONE OR MORE OF THE TAPE SEGMENTS OF THE SECOND BRAIDED LAYER 842

SECURE (E.G., TACK WELD) THE SECOND BRAIDED LAYER TO THE FIRST BRAIDED LAYER 844

SECURE (E.G., TACK WELD) PAD-UPS TO SECOND BRAIDED LAYER 846

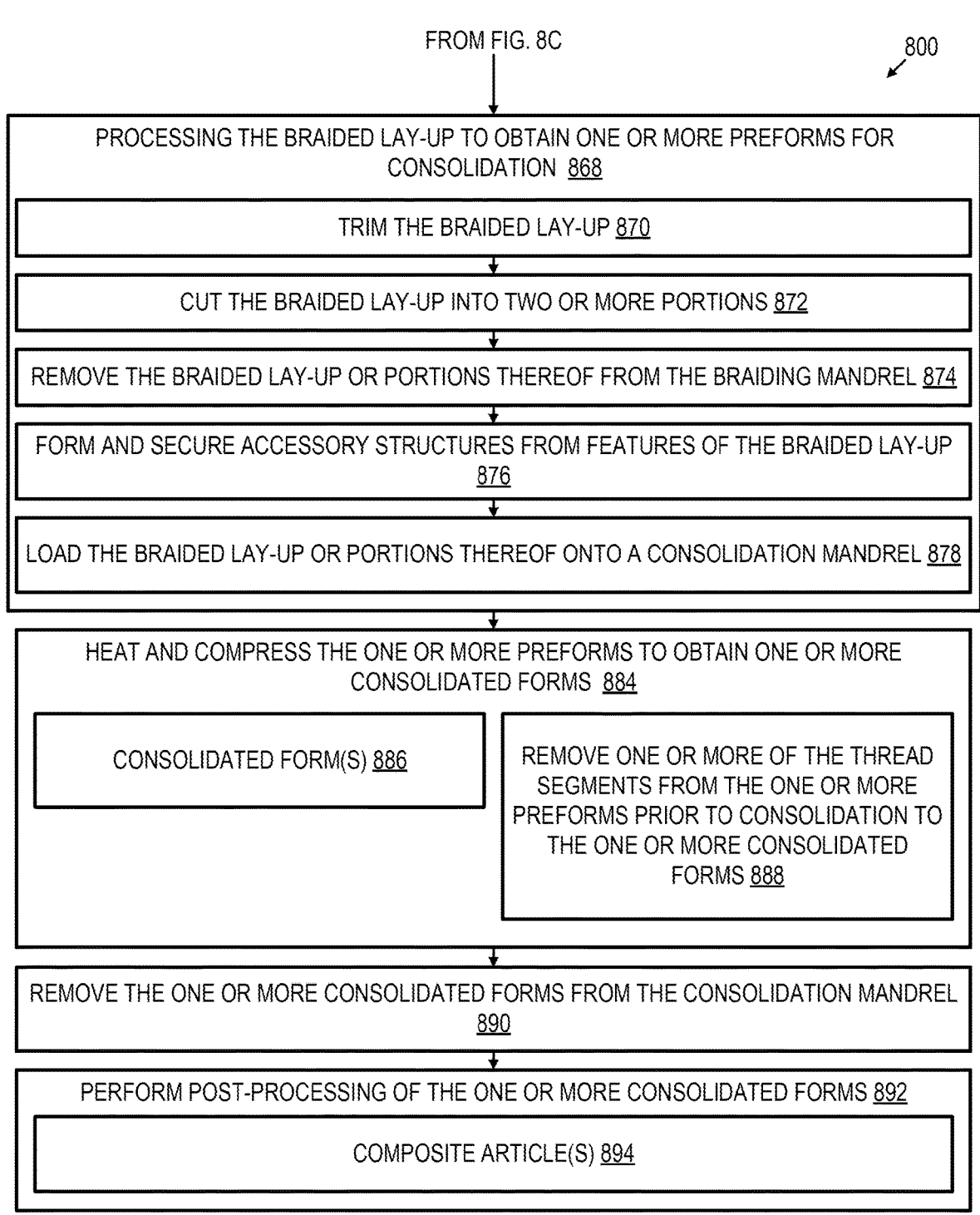

FROM FIG. 8C

800

PROCESSING THE BRAIDED LAY-UP TO OBTAIN ONE OR MORE PREFORMS FOR CONSOLIDATION 868

TRIM THE BRAIDED LAY-UP 870

CUT THE BRAIDED LAY-UP INTO TWO OR MORE PORTIONS 872

REMOVE THE BRAIDED LAY-UP OR PORTIONS THEREOF FROM THE BRAIDING MANDREL 874

FORM AND SECURE ACCESSORY STRUCTURES FROM FEATURES OF THE BRAIDED LAY-UP 876

LOAD THE BRAIDED LAY-UP OR PORTIONS THEREOF ONTO A CONSOLIDATION MANDREL 878

HEAT AND COMPRESS THE ONE OR MORE PREFORMS TO OBTAIN ONE OR MORE CONSOLIDATED FORMS 884

CONSOLIDATED FORM(S) 886

REMOVE ONE OR MORE OF THE THREAD SEGMENTS FROM THE ONE OR MORE PREFORMS PRIOR TO CONSOLIDATION TO THE ONE OR MORE CONSOLIDATED FORMS 888

REMOVE THE ONE OR MORE CONSOLIDATED FORMS FROM THE CONSOLIDATION MANDREL 890

PERFORM POST-PROCESSING OF THE ONE OR MORE CONSOLIDATED FORMS 892

COMPOSITE ARTICLE(S) 894

FIG. 8D

THERMOPLASTIC BRAIDING FOR THE MANUFACTURE OF COMPOSITE ARTICLES

CROSS REFERENCE TO RELATED APPLICATIONS

This application claims priority to U.S. Provisional Patent Application No. 63/588,955, entitled THERMOPLASTIC BRAIDING FOR THE MANUFACTURE OF COMPOS-ITE ARTICLES, filed Oct. 9, 2023, the entirety of which is hereby incorporated herein by reference for all purposes

FIELD

The subject matter of the present disclosure relates generally to the manufacture of composite articles, and more specifically to braiding fiber-reinforced thermoplastic resin tape with thread.

BACKGROUND

A variety of composite articles can be formed from thermoplastics. As an example, a thermoplastic resin can be reinforced with fibers to form a fiber-reinforced thermoplastic resin tape. Segments of the fiber-reinforced thermoplastic resin tape can be braided with each other to form a lay-up that is then heated to obtain a consolidated form of the braided tape segments. The consolidated form can be post-processed by cutting or shaping to obtain a final form of the composite article.

SUMMARY

An example method of manufacturing a composite article comprises forming one or more braided layers around a braiding mandrel. Each braided layer is formed by braiding tape segments of a fiber-reinforced thermoplastic resin tape applied at a tape tow orientation with thread segments applied at a thread tow orientation. For each braided layer, the thread tow orientation is biased at an angle relative to the tape tow orientation. Braiding of thread segments with fiber-reinforced thermoplastic resin tape segments at different tow orientations offers the potential to stabilize the tape segments within a braided layer while also addressing potential challenges associated with braiding of fiber-reinforced materials.

In an example, the thread segments include a thermoplastic resin thread that is integrated into a consolidated form with the fiber-reinforced thermoplastic resin tape by application of heat. Braiding thermoplastic resin thread with fiber-reinforced thermoplastic resin tape offers the potential to provide a high rate of composite material placement without introducing significant bulk or mass as compared to braiding fiber-reinforced materials with each other. Integration of the thermoplastic resin thread into the consolidated form may reduce undulation of fibers of the fiber-reinforced thermoplastic resin tape that remain within the consolidated form. For example, integration of the thermoplastic resin thread into the surrounding resin matrix during consolidation may enable fibers of the fiber-reinforced thermoplastic resin tape to relax into a configuration that exhibits less undulation as compared to braiding with fiber-reinforced thermoplastic resin tape.

BRIEF DESCRIPTION OF THE DRAWINGS

FIGS. 8A, 8B, 8C, and 8D are flow diagrams depicting an example method of manufacturing a composite article.

DETAILED DESCRIPTION

Figures 1, 2:
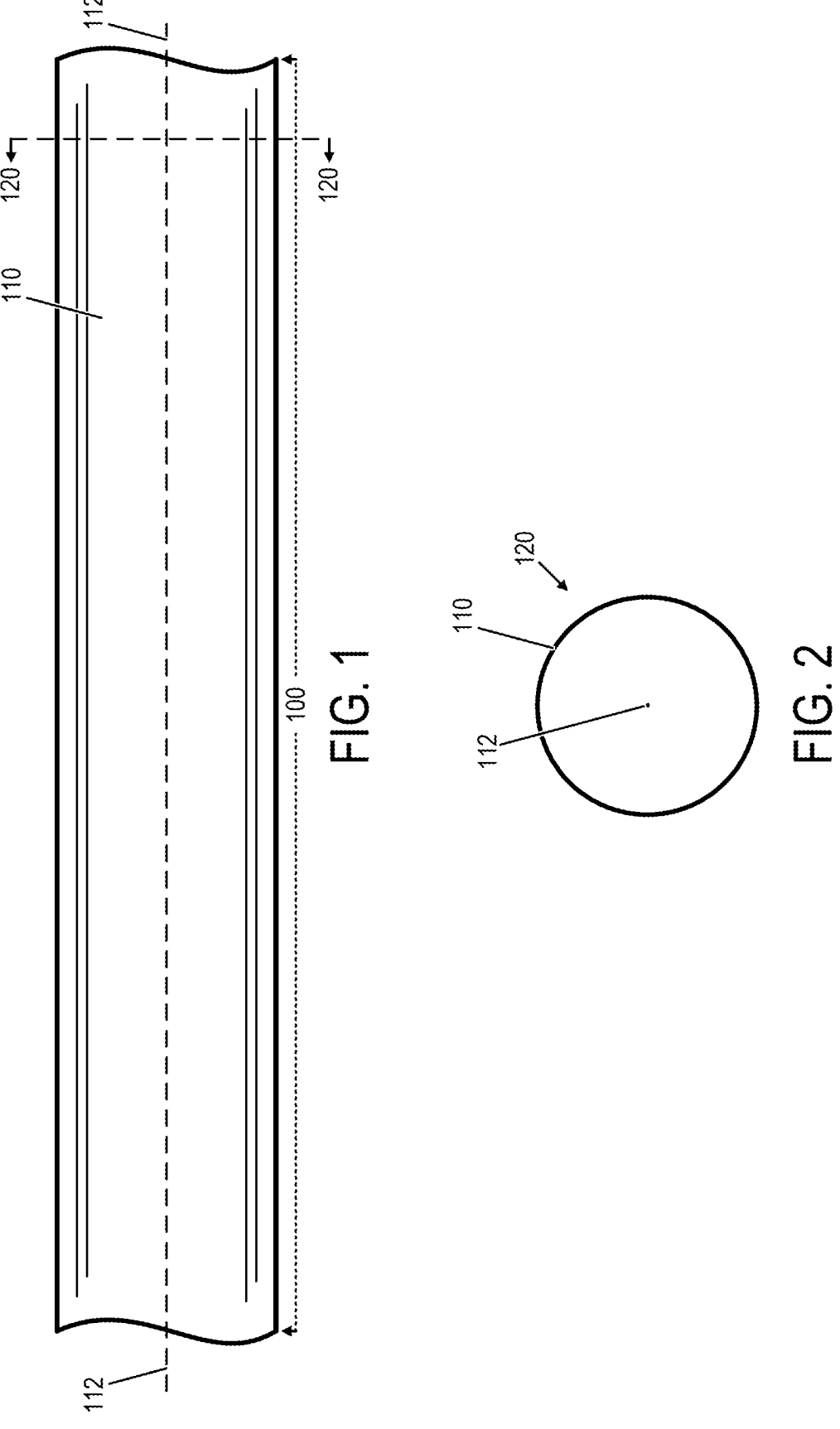
FIG. 1 depicts a segment of an example braiding mandrel having a longitudinal axis.
FIG. 2 depicts the braiding mandrel of FIG. 1 as viewed within a section that is orthogonal to the longitudinal axis.

According to an example disclosed herein, a composite article may be formed using a braided lay-up that includes one or more braided layers. As an example, one or more braided layers may be formed circumferentially around a braiding mandrel along at least a portion of a longitudinal axis of the braiding mandrel. Each braided layer may include fiber-reinforced thermoplastic resin tape segments braided with thread segments. The fiber-reinforced thermoplastic resin tape segments of each braided layer may be applied at a respective tape tow orientation, and the thread segments of that braided layer may be applied at a thread tow orientation that differs from the tape tow orientation.

The use of fibers to reinforce thermoplastic resin may facilitate the braiding process by increasing the strength and resiliency of the thermoplastic resin. Additionally, fiber reinforcement of thermoplastic resin may increase the strength and resiliency of the resulting composite article. However, potential disadvantages of braiding with fiber-reinforced thermoplastic resin tape or other fiber-reinforced resin materials can include introduction of bulk into the braided form and/or undulation of fibers that remain in the composite article following consolidation.

As an example, braiding fiber-reinforced thermoplastic resin tape or other fiber-reinforced resin materials may introduce undulation to the fibers within the consolidated form. Undulation can occur in fiber-reinforced thermoplastic tape braiding as each segment of tape, along its length in the braid, alternately passes over, and then under, other tape segments in the braid. Accordingly, the reinforcing fibers within each tape segment can exhibit this undulation, especially in the case in which the reinforcing fibers run parallel to the length of the thermoplastic tape. This undulation is reduced, to some extent, when the braided form is debulked and the thermoplastic is consolidated, but is still present in the consolidated form as the fibers are prevented from relaxing into a non-undulated condition due to the "over-under" nature of the braid. The fiber undulation that remains in the consolidated form may adversely affect some of the material characteristics of the consolidated form, such as compared with a form in which the fibers do not undulate. Reducing fiber undulation, such as by incorporating thermoplastic resin into the braded form in accordance with the present disclosure, can improve the material characteristics of the form such as compared with a form in which fiber undulation is not reduced.

As another example, braiding fiber-reinforced thermoplastic resin tape or other fiber-reinforced resin materials may introduce bulk into the braided form. This is generally attributable to the resiliency or stiffness of the tape segments that are braided together. The form must be debulked (generally, compressed) prior to consolidation. Reduction of bulk, for example by incorporating thermoplastic resin thread into the braided form (which is typically more pliable than fiber-reinforced thermoplastic resin tape), in accordance with the present disclosure, can simplify this pre-consolidation step. Braiding of thread segments with fiber-reinforced thermoplastic resin tape segments at different tow orientations offers the potential to stabilize the fiber-reinforced thermoplastic resin tape segments within a braided layer, and provide a high rate of composite material placement without adding significant bulk or mass as compared to braiding fiber-reinforced materials with each other.

In a first example of the disclosed method, the thread segments include a thermoplastic resin thread. The thermoplastic resin thread may take the form of a single filament thread or a multi-filament thread, as examples. A preform that includes the fiber-reinforced thermoplastic resin tape and the thermoplastic resin thread of at least a portion of the one or more braided layers may be heated to obtain a consolidated form in which the thermoplastic resin thread is integrated into the consolidated form. For example, the thermoplastic resin thread may be integrated into the surrounding resin matrix of the consolidated form with resin of the fiber-reinforced thermoplastic resin tape.

Integration of the thermoplastic resin thread into the consolidated form offers the potential to reduce undulation of fibers that remain from the fiber-reinforced thermoplastic resin tape within the consolidated form. As the thermoplastic resin thread is not reinforced with fibers, the thermoplastic resin thread can completely integrate into the resin matrix of the consolidated form. As an example, integration of the thermoplastic resin thread into the surrounding resin matrix during consolidation may enable fibers of the fiber-reinforced thermoplastic resin tape to relax into a configuration that exhibits less undulation as compared to braiding with fiber-reinforced thermoplastic resin tape. While unreinforced thermoplastic resin thread may offer less strength or resiliency as compared to fiber-reinforced materials, thermoplastic resin thread may offer a suitable alternative for braiding and stabilizing fiber-reinforced thermoplastic resin tape segments within a braided layer prior to consolidation.

In a second example of the disclosed method, the thread segments include a metallic thread. The metallic thread may take the form of a single filament thread or a multi-filament thread, as examples. A preform that includes at least a portion of one or more braided layers may be heated to obtain a consolidated form. The metallic thread may be removed from the preform prior to consolidation to the consolidated form. Removal of the metallic thread from the preform prior to consolidation offers the potential to reduce undulation of fibers that remain from the fiber-reinforced thermoplastic resin tape within the consolidated form. As an example, removal of the metallic thread prior to consolidation may enable fibers of the fiber-reinforced thermoplastic resin tape to relax into a configuration that exhibits less undulation as compared to braiding with fiber-reinforced thermoplastic resin tape.

In at least some examples, braiding of fiber-reinforced thermoplastic resin tape segments with thread segments to form a braided layer may be performed using a braiding ring. As an example, each braided layer may be formed using a respective braiding ring that applies the fiber-reinforced thermoplastic resin tape segments at a tape tow orientation and the thread segments at a thread tow orientation defined for the particular braided layer. As an example, a lay-up that includes three braided layers may be formed circumferentially around a braiding mandrel using three braiding rings.

As further described herein, the fiber-reinforced thermoplastic resin tape segments of each braided layer may have a different tow orientation than the fiber-reinforced thermoplastic resin tape segments of other braided layers. Varying the tow orientation of the tape segments between or among the braided layers offers the potential to increase or vary the strength of the consolidated form.

As an illustrative example, a first braided layer includes tape segments having a tape tow orientation of 0 degrees relative to the longitudinal axis of the braiding mandrel. A second braided layer includes tape segments having a tape tow orientation that is biased in a first angular direction (e.g., negative 60 degrees) relative to the longitudinal axis of the braiding mandrel. A third braided layer may include tape segments having a tape tow orientation that is biased in a second angular direction (e.g., positive 60 degrees) relative to the longitudinal axis of the braiding mandrel. At each braided layer, the thread segments that are braided with the tape segments of that braided layer may be biased at an angle relative to the tape segments to stabilize the tape segments for consolidation.

FIG. 1 depicts a segment 100 of an example braiding mandrel 110 having a longitudinal axis 112. For illustrative purposes, braiding mandrel 110 takes the form of a cylinder in this example. It will be understood that a braiding mandrel can take other suitable forms, such as described in further detail with reference to FIGS. 9 and 10, as additional examples.

FIG. 2 depicts braiding mandrel 110 as viewed within a section 120 that is orthogonal to longitudinal axis 112. In this example, braiding mandrel 110 has a circular cross section corresponding to a cross section of a cylinder.

Figure 3:
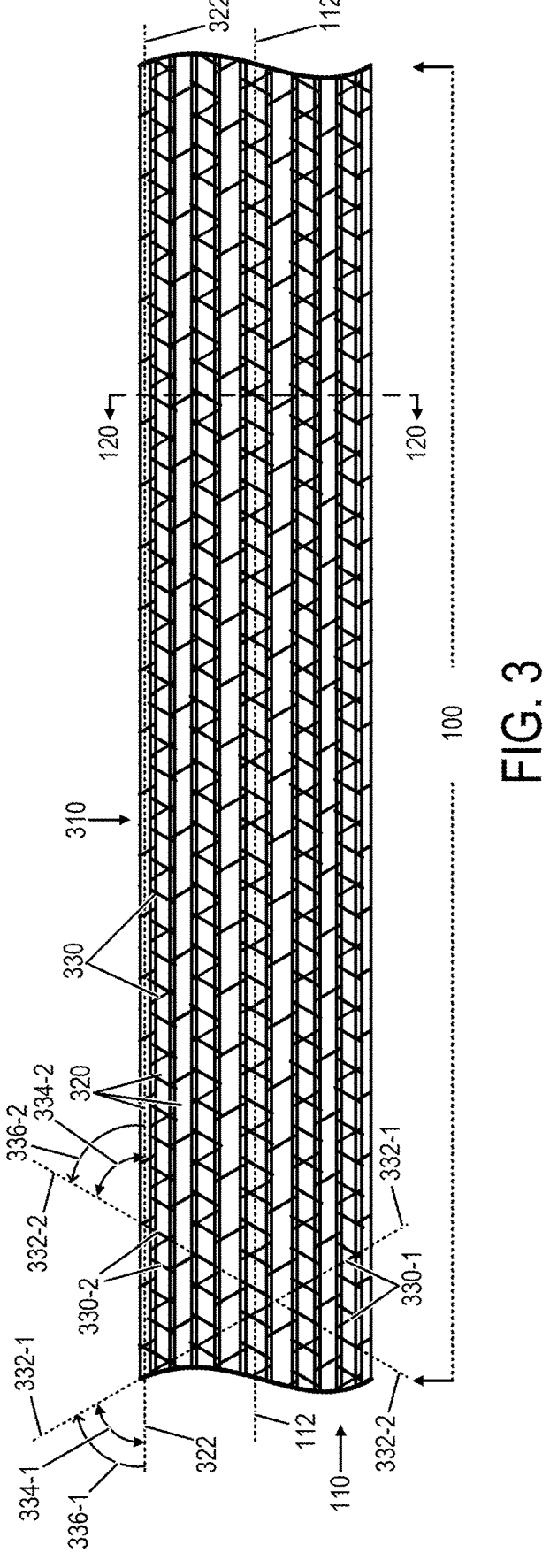
FIG. 3 depicts a first example of a braided layer that is formed around the braiding mandrel of FIG. 1 along at least a portion of the longitudinal axis.

FIG. 3 depicts a first example of a braided layer 310 formed around braiding mandrel 110 along at least a portion of longitudinal axis 112 of the braiding mandrel corresponding to segment 100. Braided layer 310 is formed by braiding tape segments 320 of a fiber-reinforced thermoplastic resin tape applied at a tape tow orientation 322 with thread segments (e.g., 330-1, 330-2) applied at a thread tow orientation (e.g., 332-1, 332-2).

In the example of braided layer 310, a first subset of thread segments 330-1 is applied at thread tow orientation 332-1 that is biased at angle 334-1 in a first angular direction 336-1 relative to tape tow orientation 322. For example, the first subset of thread segments 330-1 may cross over and under tape segments 320 according to a braiding pattern that stabilizes the tape segments within braided layer 310. Example braiding patterns may feature the first subset of thread segments 330-1 crossing over one or more of tape segments 320, and then under one or more of tape segments 320 in a repeating pattern throughout braided layer 310.

Additionally, in the example of braided layer 310, a second subset of thread segments 330-2 is applied at thread tow orientation 332-2 that is biased at angle 334-2 in a second angular direction 336-2 relative to tape tow orientation 322. For example, the second subset of thread segments 330-2 may cross over and under tape segments 320 according to a braiding pattern that further stabilizes the tape segments within braided layer 310. Example braiding patterns may feature the second subset of thread segments 330-2 crossing over one or more of tape segments 320, and then under one or more of tape segments 320 in a repeating pattern throughout braided layer 310.

As an illustrative example, tape tow orientation 322 is parallel to longitudinal axis 112, angle 334-1 of thread tow orientation 332-1 is –60 degrees relative to tape tow orientation 322, and angle 334-2 of thread tow orientation 332-2 is +60 degrees relative to tape tow orientation 322. It will be understood that other suitable thread tow orientations may be used that are biased at an angle relative to the tape tow orientation.

As described above, tape tow orientation 322 of tape segments 320 of braided layer 310 is parallel to longitudinal axis 112, which may be referred to as an axial configuration of tape segments. As described in further detail with reference to FIGS. 4 and 5, other examples of braided layers may include tape segments that are applied at a tape tow orientation that is biased at an angle relative to longitudinal axis 112, which may be referred to as a biaxial configuration.

Figures 4, 5:
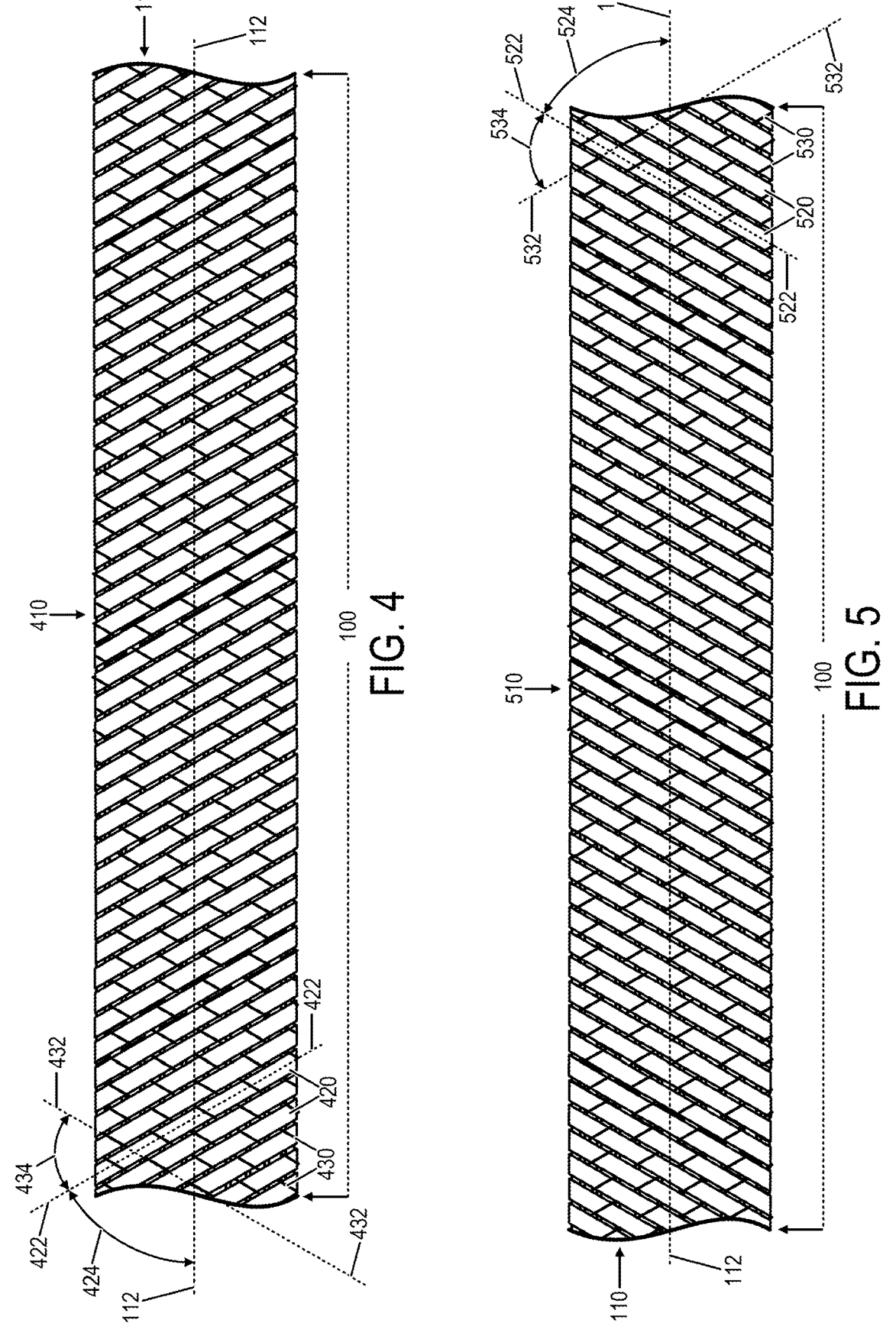
FIG. 4 depicts a second example of a braided layer that is formed around the braiding mandrel of FIG. 1 along at least a portion of the longitudinal axis.
FIG. 5 depicts a third example of a braided layer that is formed around the braiding mandrel of FIG. 1 along at least a portion of the longitudinal axis.

FIG. 4 depicts a second example of a braided layer 410 formed around braiding mandrel 110 along at least a portion of longitudinal axis 112 of the braiding mandrel corresponding to segment 100. In this example, braided layer 410 is formed by braiding tape segments 420 of a fiber-reinforced thermoplastic resin tape applied at a tape tow orientation 422 with thread segments 430 applied at a thread tow orientation 432 that is biased at an angle 434 relative to the tape tow orientation. Furthermore, in this example, tape tow orientation 422 is biased at an angle 424 relative to longitudinal axis 112, which refers to a biaxial configuration of tape segments 420.

As an illustrative example, angle 424 of tape tow orientation 422 is –60 degrees relative to longitudinal axis 112, and angle 434 of thread tow orientation 432 is –60 degrees relative to tape tow orientation 422. In this example, thread tow orientation 432 may be described as being biased at an angle of +60 degrees relative to longitudinal axis 112. It will be understood that other suitable tape tow orientations and thread tow orientations may be used.

Thread segments 430 may cross over and under tape segments 420 according to a braiding pattern that stabilizes the tape segments within braided layer 410. Example braiding patterns may feature thread segments 430 crossing over one or more of tape segments 420, and then under one or more of tape segments 420 in a repeating pattern throughout braided layer 410.

FIG. 5 depicts a third example of a braided layer 510 formed around braiding mandrel 110 along at least a portion of longitudinal axis 112 of the braiding mandrel corresponding to segment 100. In this example, braided layer 510 is formed by braiding tape segments 520 of a fiber-reinforced thermoplastic resin tape applied at a tape tow orientation 522 with thread segments 530 applied at a thread tow orientation 532 that is biased at an angle 534 relative to the tape tow orientation. Furthermore, in this example, tape tow orientation 522 is biased at an angle 524 relative to longitudinal axis 112, which refers to a biaxial configuration of tape segments 520.

As an illustrative example, angle 524 of tape tow orientation 522 is +60 degrees relative to longitudinal axis 112, and angle 534 of thread tow orientation 532 is +60 degrees relative to tape tow orientation 522. In this example, thread tow orientation 532 may be described as being biased at an angle of –60 degrees relative to longitudinal axis 112. It will be understood that other suitable tape tow orientations and thread tow orientations may be used.

Thread segments 530 may cross over and under tape segments 520 according to a braiding pattern that stabilizes the tape segments within braided layer 510. Example braiding patterns may feature thread segments 530 crossing over one or more of tape segments 520, and then under one or more of tape segments 520 in a repeating pattern throughout braided layer 510.

Figures 6, 7:
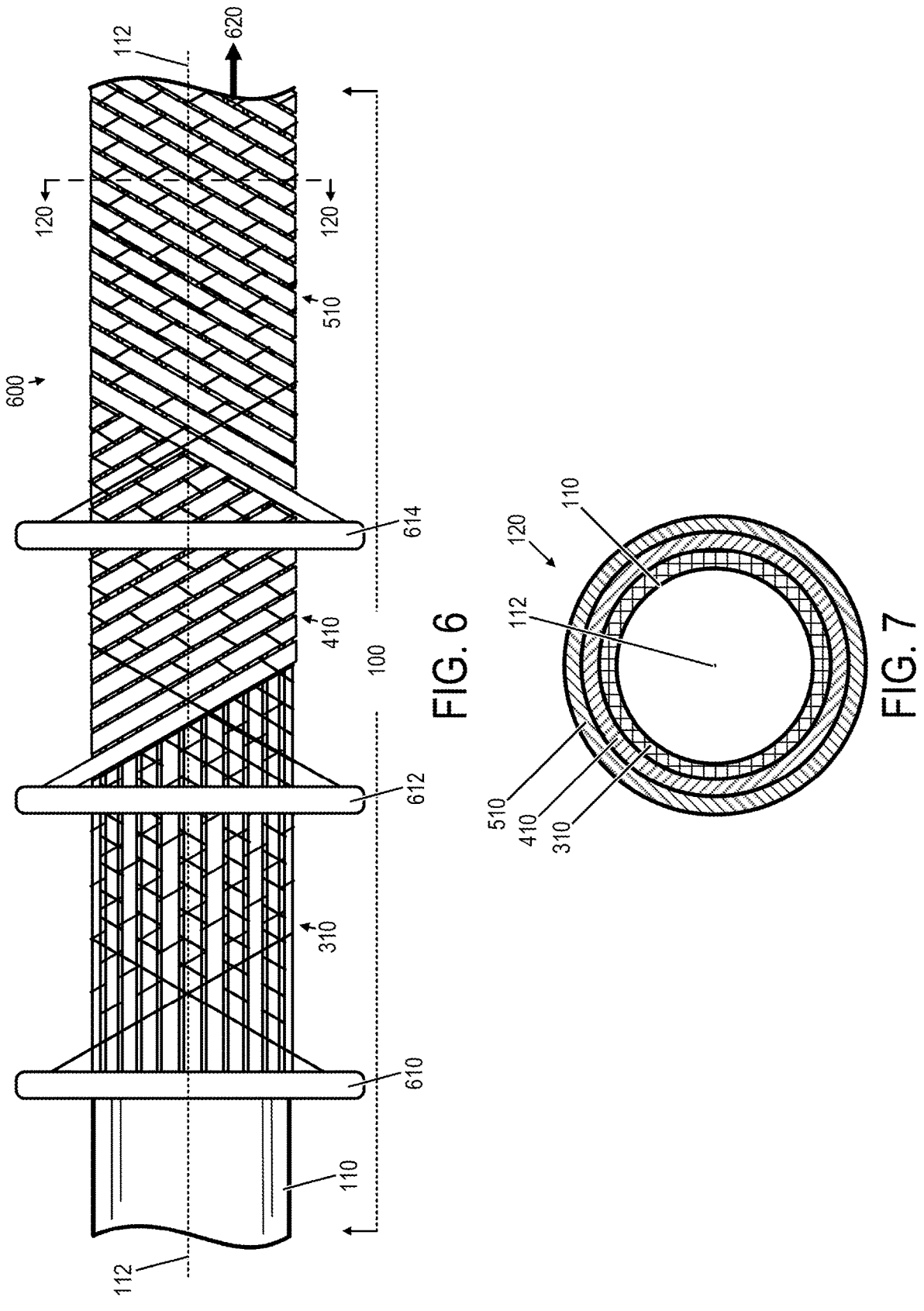
FIG. 6 depicts the braided layers of FIGS. 3, 4, and 5 being formed around the braiding mandrel of FIG. 1 using braiding rings.
FIG. 7 depicts the braided lay-up of FIG. 6 formed circumferentially around the braiding mandrel of FIG. 1 as viewed within a section.

FIG. 6 depicts an example of a braided lay-up 600 that includes a plurality of braided layers that are shown schematically to be in the process of being formed circumferentially around braiding mandrel 100 along at least a portion of longitudinal axis 112. In the example of FIG. 6, braided lay-up 600 includes braided layer 310 of FIG. 3 as a first layer formed circumferentially around braiding mandrel 110 using a first braiding ring 610. First braiding ring 610 may be sized to accommodate braiding mandrel 110 and any braided layers previously applied to the braiding mandrel within an interior region defined by the braiding ring.

Braided lay-up 600 further includes braided layer 410 of FIG. 4 as a second layer formed circumferentially around braiding mandrel 110 and braided layer 310 using a second braiding ring 612. Second braiding ring 612 may be sized to accommodate braiding mandrel 110 and any braided layers (e.g., 310) previously applied to the braiding mandrel within an interior region defined by the braiding ring.

Braided lay-up 600 further includes braided layer 510 of FIG. 5 as a third layer formed circumferentially around braiding mandrel 110, braided layer 310, and braided layer 410 using a third braiding ring 614. Third braiding ring 614 may be sized to accommodate braiding mandrel 110 and any braided layers (e.g., 310 and 410) previously applied to the braiding mandrel within an interior region defined by the braiding ring.

Braiding mandrel 110 may be moved relative to braiding rings 610, 612, and 614 throughout the braiding process, as depicted schematically in FIG. 6 by arrow 620.

It will be understood that the configuration of braiding rings 610, 612, and 614 as shown in FIG. 6 is merely representative, and is shown schematically for the purposes of explanation. As an example, braiding rings 612 and 614 in FIG. 6 are shown to be in the process of dispensing two braiding materials in biaxial configurations, whereas braiding ring 610 is shown to be dispensing a number of axial tape segments and opposing biaxial thread segments. However, braiding rings may be configured as desired, such as with any number of individual spools (not shown) of braiding material, such as tape, thread, and so forth, which can be stationary and/or configured to travel around the ring in either or both directions at desired speeds as the braiding ring moves relative to the mandrel, for example, to dispense segments of material at desired angles or orientations relative to the ring and/or mandrel. In practice, any number and/or configuration of braiding rings may be used.

It will also be understood that a braided lay-up, such as example braided lay-up 600 of FIG. 6 may include any suitable quantity and configuration of braided layers. In the example of braided lay-up 600, braided layers that neighbor each other have different tape tow orientations relative to longitudinal axis 112, and are biased at an angle relative to each other. For example, tape tow orientation 322 of braided layer 310 may be parallel to longitudinal axis 112, as described with reference to FIG. 3. Tape tow orientation 422 of braided layer 410 may be biased at an angle (e.g., −60 degrees) in a first angular direction relative to longitudinal axis 112, and therefore biased at an angle relative to tape tow orientation 322 of braided layer 310. As another example, tape tow orientation 522 of braided layer 510 may be biased at an angle (e.g., +60 degrees) in a second angular direction relative to longitudinal axis 112, and therefore biased at an angle relative to tape tow orientation 422 of braided layer 410. As previously described, the use of varying tape tow orientations among braided layers may be used to increase or vary the strength of a braided lay-up.

FIG. 7 depicts braided lay-up 600 formed circumferentially around braiding mandrel 110 as viewed within section 120 shown in FIG. 6. In this example, braided layer 310 of FIG. 3 forms a first braided layer of braided lay-up 600, braided layer 410 of FIG. 4 forms a second braided layer of the braided lay-up, and braided layer 510 of FIG. 5 forms a third braided layer of the braided lay-up. As previously described, a braided lay-up may include any suitable quantity and configuration of braided layers.

FIGS. 8A, 8B, 8C, and 8D are flow diagrams depicting an example method 800 of manufacturing a composite article. The composite article may be formed using a braided lay-up that includes one or more braided layers. Within FIGS. 8A, 8B, and 8C, a plurality of braided layers may be formed circumferentially around a braiding mandrel along at least a portion of a longitudinal axis of the braiding mandrel, as depicted at operation 802. As part of operation 802, each braided layer may be formed by braiding tape segments of a fiber-reinforced thermoplastic resin tape applied at a tape tow orientation with thread segments applied at a thread tow orientation that is biased at an angle relative to the tape tow orientation. Furthermore, in at least some examples, neighboring braided layers of the braided lay-up may have different tape tow orientations relative to each other, such as previously described with reference to FIG. 6.

Referring to FIG. 8A, at 810, the method includes forming a first braided layer around the braiding mandrel along at least the portion of the longitudinal axis of the braiding mandrel. As an example, the first braided layer may include one of braided layer 310 of FIG. 3, braided layer 410 of FIG. 4, or braided layer 510 of FIG. 5. As previously described with reference to FIG. 6, the first braided layer may include braided layer 310 of FIG. 3 in which the tape tow orientation is parallel to the longitudinal axis of the braiding mandrel. In at least some examples, the tape tow orientation being parallel to the longitudinal axis of the braiding mandrel may provide a suitable base for the braided lay-up upon which additional braided layers may be formed. However, it will be understood that a tape tow orientation that is biased at an angle relative to the longitudinal axis of the braiding mandrel may be used for the first braided layer in other examples.

As depicted at 812, the tape tow orientation of the tape segments of the first braided layer has a first angular orientation relative to the longitudinal axis of the braiding mandrel. As described with reference to braided layer 310 of FIG. 3, the tape tow orientation may be parallel to the longitudinal axis of the braiding mandrel. As described with reference to braided layers 410 and 510 of FIGS. 4 and 5, the tape tow orientation may be biased at an angle relative to the longitudinal axis of the braiding mandrel.

As depicted at 814, the thread tow orientation of the thread segments of the first braided layer may be biased at an angle relative to the tape tow orientation of the tape segments of the first braided layer.

As part of forming the first braided layer at 810, the method at 816 includes braiding the tape segments of the fiber-reinforced thermoplastic resin tape applied at the tape tow orientation with the thread segments applied at the thread tow orientation. As an example, the tape segments may be braided with the thread segments using a first braiding ring, as previously described with reference to FIG. 6.

The thread segments of the first braided layer may take various forms. As a first example, the thread segments of the first braided layer include a thermoplastic resin thread 818. As a second example, the thread segments of the first braided layer include a metallic thread 820.

At 822, the method may include securing one or more of the thread segments to one or more of the tape segments of the first braided layer to further stabilize the first braided layer. As an example, thread segments may be secured to tape segments by tack welding, which may include selectively applying heat to locations of the first braided layer where thread segments are to be secured to tape segments.

At 824, the method may include securing one or more pad-ups to the first braided layer. Pad-ups may be used to define and add reinforcement structure to a braided lay-up. A pad-up may take the form of a fiber-reinforced resin pad, as an example. Each pad-up may be secured to the first braided layer by tack welding the pad-up to one or more locations of the first braided layer, such as to portions of one or more thread segments and/or tape segments.

Referring to FIG. 8B, at 830, the method includes forming a second braided layer around the first braided layer and the braiding mandrel along at least the portion of the longitudinal axis of the braiding mandrel. As an example, the first braided layer may include another one of braided layer 310 of FIG. 3, braided layer 410 of FIG. 4, or braided layer 510 of FIG. 5 to provide a different tape tow orientation relative to the first braided layer.

As depicted at 832, the tape tow orientation of the tape segments of the second braided layer has a second angular orientation relative to the longitudinal axis of the braiding mandrel. As described with reference to braided layer 310 of FIG. 3, the tape tow orientation of the second braided layer may be parallel to the longitudinal axis of the braiding mandrel. As described with reference to braided layers 410 and 510 of FIGS. 4 and 5, the tape tow orientation of the second braided layer may be biased at an angle relative to the longitudinal axis of the braiding mandrel.

As depicted at 834, the thread tow orientation of the thread segments of the second braided layer may be biased at an angle relative to the tape tow orientation of the tape segments of the second braided layer.

As part of forming the second braided layer at 830, the method at 836 includes braiding the tape segments of the fiber-reinforced thermoplastic resin tape applied at the tape tow orientation with the thread segments applied at the thread tow orientation. As an example, the tape segments may be braided with the thread segments using a second braiding ring, as previously described with reference to FIG. 6.

The thread segments of the second braided layer may take various forms. As a first example, the thread segments of the second braided layer include a thermoplastic resin thread 838. As a second example, the thread segments of the second braided layer include a metallic thread 840.

At 842, the method may include securing one or more of the thread segments to one or more of the tape segments of the second braided layer to further stabilize the second braided layer. As an example, thread segments may be secured to tape segments by tack welding.

At 844, the method may include securing the second braided layer to the first braided layer to further stabilize the braided lay-up. As an example, thread segments and/or tape segments of the second braided layer may be secured to thread segments and/or tape segments of the first braided layer by tack welding.

At 846, the method may include securing one or more pad-ups to the second braided layer. As previously described, pad-ups may be used to define and add reinforcement structure to a braided lay-up. Each pad-up may be secured to the second braided layer by tack welding the pad-up to one or more locations of the second braided layer, such as to portions of one or more thread segments and/or tape segments.

Figure 8C:
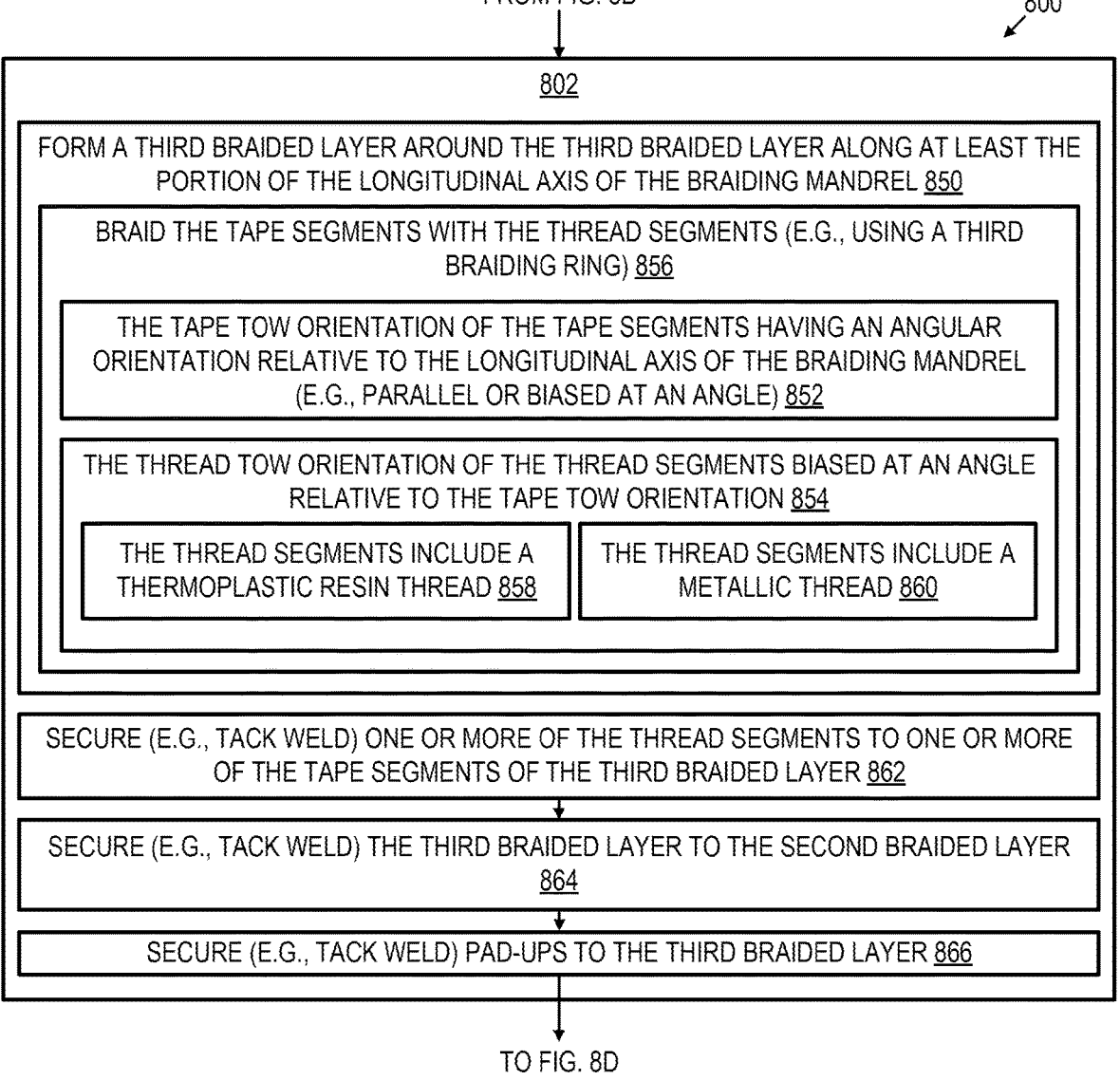

Referring to FIG. 8C, at 850, the method includes forming a third braided layer around the braided layer, the second braided layer, and the braiding mandrel along at least the portion of the longitudinal axis of the braiding mandrel. As an example, the third braided layer may include another one of braided layer 310 of FIG. 3, braided layer 410 of FIG. 4, or braided layer 510 of FIG. 5 to provide a different tape tow orientation relative to some or all of the preceding layers, including the second braided layer and the first braided layer.

As depicted at 852, the tape tow orientation of the tape segments of the third braided layer has a third angular orientation relative to the longitudinal axis of the braiding mandrel. As described with reference to braided layer 310 of FIG. 3, the tape tow orientation of the third braided layer may be parallel to the longitudinal axis of the braiding mandrel. As described with reference to braided layers 410 and 510 of FIGS. 4 and 5, the tape tow orientation of the third braided layer may be biased at an angle relative to the longitudinal axis of the braiding mandrel.

As depicted at 854, the thread tow orientation of the thread segments of the second braided layer may be biased at an angle relative to the tape tow orientation of the tape segments of the third braided layer.

As part of forming the third braided layer at 850, the method at 856 includes braiding the tape segments of the fiber-reinforced thermoplastic resin tape applied at the tape tow orientation with the thread segments applied at the thread tow orientation. As an example, the tape segments may be braided with the thread segments using a third braiding ring, as previously described with reference to FIG. 6.

The thread segments of the third braided layer may take various forms. As a first example, the thread segments of the third braided layer include a thermoplastic resin thread 858. As a second example, the thread segments of the third braided layer include a metallic thread 860.

At 862, the method may include securing one or more of the thread segments to one or more of the tape segments of the third braided layer to further stabilize the third braided layer. As an example, thread segments may be secured to tape segments by tack welding.

At 844, the method may include securing the third braided layer to the second braided layer to further stabilize the braided lay-up. As an example, thread segments and/or tape segments of the third braided layer may be secured to thread segments and/or tape segments of the second braided layer by tack welding.

At 846, the method may include securing one or more pad-ups to the third braided layer. As previously described, pad-ups may be used to define and add reinforcement structure to a braided lay-up. Each pad-up may be secured to the third braided layer by tack welding the pad-up to one or more locations of the third braided layer, such as to portions of one or more thread segments and/or tape segments.

In some examples, a braided lay-up formed by method 800 may include four or more braided layers. In this example, portions of method 800 used to form the first braided layer, the second braided layer, and/or the third braided layer may be repeated one or more additional times to add one or more additional braided layers to the braided lay-up. For example, another instance of the first braided layer formed at 810 or the second braided layer formed at 830 may be formed around the third braided layer. As each additional braided layer is formed around a preceding braided layer, the additional braided layer may have a tape tow orientation that differs from the preceding braided layer. This configuration provides for tape segments at successive braided layers that are angled relative to each other, thereby varying strength and/or increasing stability of the braided lay-up.

Referring to FIG. 8D, at 868, the method includes processing the braided lay-up to obtain one or more preforms for consolidation. As part of processing performed at 868, the method at 870 may include performing one or more of operations 870-880.

At 870, the method may include trimming the braided lay-up to obtain a desired form. An example of trimming a braided lay-up is described in further detail with reference to FIG. 12.

At 872, the method may include cutting the braided lay-up into two or more portions. In at least some examples, the braided lay-up may be cut into two or more portions to enable the braided lay-up to be removed from the braiding mandrel. An example of cutting a braided lay-up is described in further detail with reference to FIG. 13.

At 874, the method may include removing the braided lay-up or portions thereof from the braiding mandrel. Removal of the braided lay-up or portions thereof from the braiding mandrel can enable further processing of the braided lay-up or portions thereof, such as for consolidation on a consolidation mandrel. However, in some examples, the braiding mandrel may also be used as a consolidation mandrel. In these examples, operation 874 may be omitted. Furthermore, in some examples, the braiding mandrel may take the form of a collapsible braiding mandrel that is inflated to provide support for the braided lay-up during formation of the various braided layers. In these example, cutting of the braided lay-up at 872 may be omitted, as the collapsible braiding mandrel may be removed from the braided lay-up without cutting of the braided lay-up.

At 876, the method may include forming and securing any accessory structures from features of the braided lay-up. An example of forming and security accessory structures is described in further detail with reference to FIG. 14.

At 878, the method may include loading the braided lay-up or portions thereof onto a consolidation mandrel. An example consolidation mandrel is described in further detail with reference to FIG. 15.

Following processing performed at operation 868, the one or more preforms obtained from the braided lay-up or portions are ready for consolidation.

At 884, the method includes heating and compressing the one or more preforms to obtain one or more consolidated forms 886. Any suitable technique for heating and compressing the preforms may be used to obtain the consolidated forms. As an example, induction heating may be used to heat the preforms that are compressed onto the consolidation mandrel by one or more inflatable bladders. Compressing the preform during heating and consolidation can reduce the bulk of the preform and resulting consolidated form by decreasing or eliminating volumetric regions of free air space or voids within individual braided layers and/or between the braided layers.

Heat applied to the one or more preforms causes thermoplastic resin of the fiber-reinforced thermoplastic resin tape and the thermoplastic resin thread (if used for braiding) of each braided layer to integrate into a resin matrix of the consolidated form. In the case of thermoplastic resin thread being used in one or more of the braided layers, fibers of the fiber-reinforced thermoplastic resin tape of those braided layers may relax during the heating process, thereby potentially reducing undulation of the fibers.

In examples where one or more thread segments of the braided lay-up include a metallic thread, the method at 888 may include removing the one or more thread segments that include the metallic thread while heating is performed at 884, but prior to compressing and consolidating the preforms to the consolidated forms. As an example, metallic thread segments may be removed from the one or more preforms by pulling the metallic thread segments from the preform as the preform is heated. Following removal of the metallic thread segments, the preform can be compressed to obtain the consolidated form. Heating of the preforms may serve to melt or soften resin contained in the preforms to facilitate removal of the metallic thread segments. In another example, the metallic thread segments may be removed from the preforms prior to heating. Removal of the metallic thread segments prior to consolidation may enable fibers of the fiber-reinforced thermoplastic resign tape to relax during the heating process, thereby potentially reducing undulation of the fibers in the consolidated form.

At 890, the method includes removing the one or more consolidated forms from the consolidation mandrel. At 892, the method includes performing post-processing of the one or more consolidated forms. As an example, the consolidated forms may be trimmed, cut, sanded, painted, etc. to obtain a final form of one or more composite articles 894.

The thermoplastic materials described herein, including the fiber-reinforced thermoplastic resin tape, thermoplastic resin thread, and thermoplastic resin pad-ups may include polyaryletherketone (PAEK) thermoplastics, such as polyether ether ketone (PEEK) and/or polyetherketoneketone (PEKK), polyphenylene sulfide (PPS), and/or polyetherimide (PEI), as examples. Fiber contained within the fiber-reinforced thermoplastic resin tape and thermoplastic resin pad-ups may include graphite fibers, as an example. As an example, the fiber-reinforced thermoplastic resin tape described herein may take the form of a thermoplastic slit tape in which fibers are pre-impregnated with thermoplastic resin. Other suitable types of thermoplastic resins and/or reinforcement fibers may be used.

Figure 9:
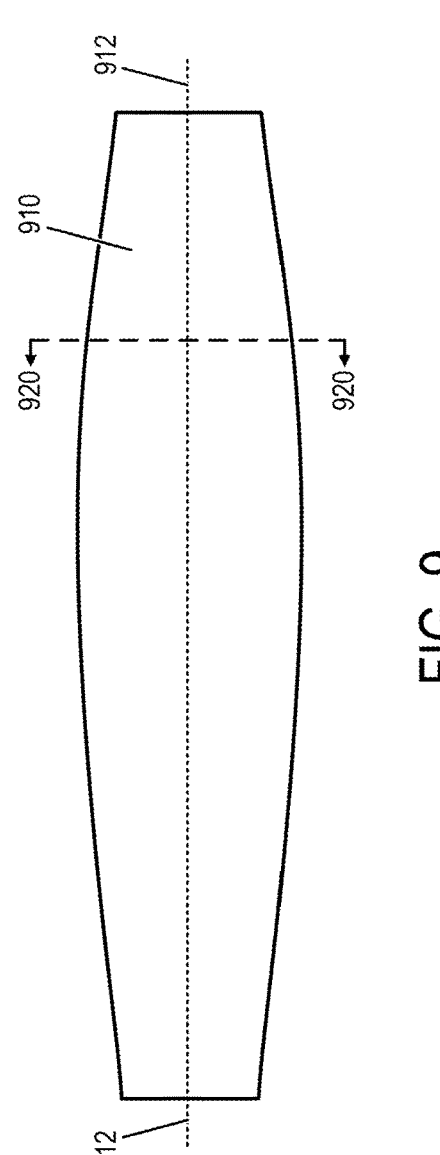
FIG. 9 depicts another example of a braiding mandrel having a longitudinal axis.

FIG. 9 depicts another example of a braiding mandrel 910 around which one or more braided layers may be formed along at least a portion of a longitudinal axis 912 of the braiding mandrel. In contrast to braiding mandrel 110 of FIG. 1, braiding mandrel 910 has a cross section that varies along longitudinal axis 912. Braiding mandrel 910 may be used to form composite articles that include a pair of structural ribs of an aeronautical vehicle, as an example.

Figure 10:
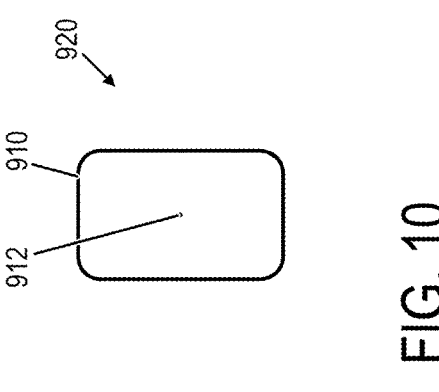
FIG. 10 depicts the braiding mandrel of FIG. 9 as viewed within a section that is orthogonal to the longitudinal axis.

FIG. 10 depicts braiding mandrel 910 of FIG. 9 as viewed within a section 920 that is orthogonal to longitudinal axis 912. In this example, braiding mandrel 910 is a closed form that approximates a rectangular shape when viewed within section 920.

Figure 11:
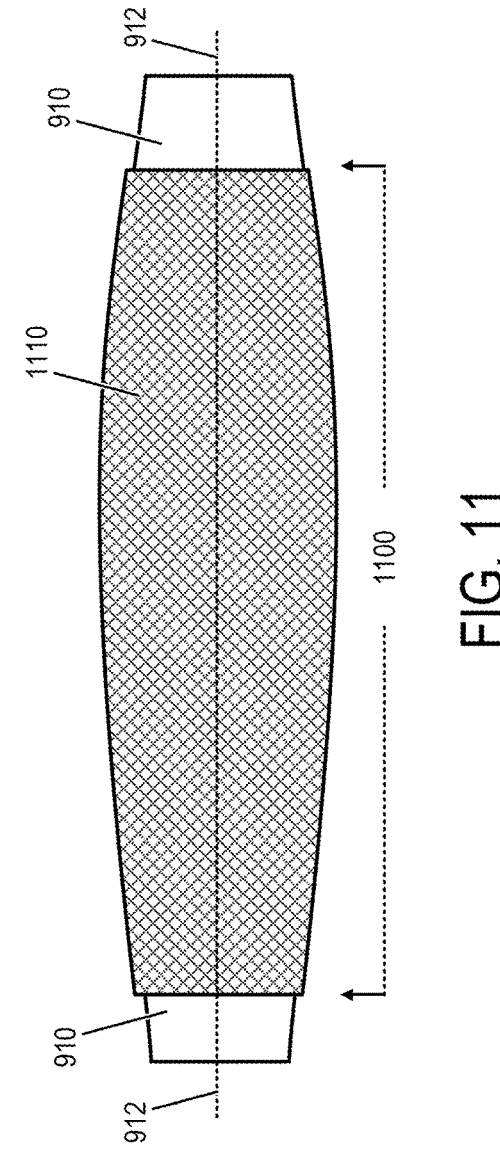
FIG. 11 depicts another example of a braided lay-up formed around a braiding mandrel along at least a portion of longitudinal axis of the braiding mandrel.

FIG. 11 depicts an example of a braided lay-up 1110 of one or more braided layers that may be formed around braiding mandrel 910. As an example, method 800 of FIG. 8 may be performed to obtain braided lay-up 1110. In the example of braided lay-up 1110, each braided layer may have a thread tow orientation that is biased at an angle relative to the tape tow orientation of that braided layer. Additionally, in at least some examples, each braided layer of braided lay-up 1110 may have a tape tow orientation that is biased at an angle relative to a tape tow orientation of neighboring braided layers.

Figure 12:
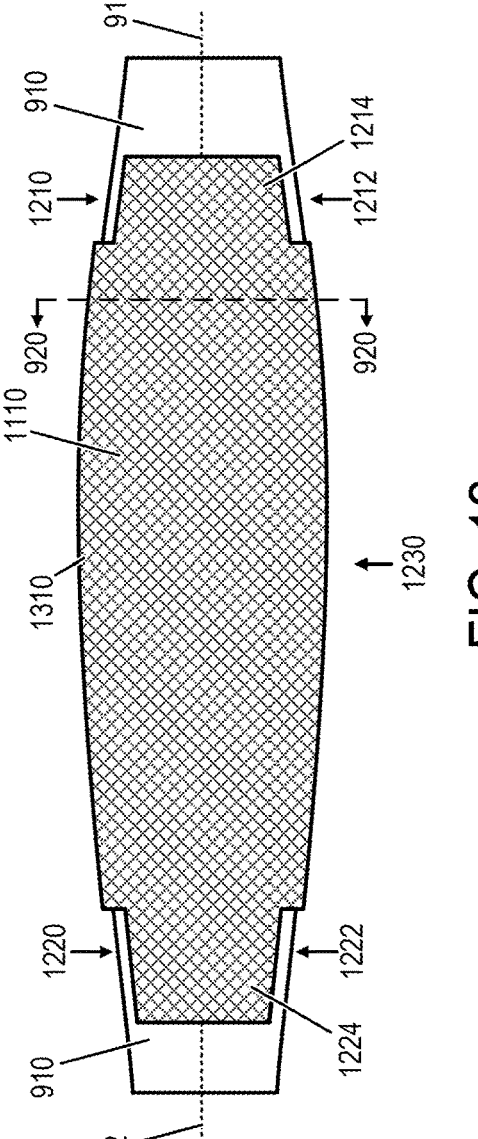
FIG. 12 depicts an example in which the braided lay-up of FIG. 11 is trimmed to form tab portions of a structural rib of an aeronautical vehicle.

FIG. 12 depicts an example in which braided lay-up 1110 of FIG. 11 is trimmed at 1210 and 1212 to form a first tab portion 1214, and is trimmed at 1220 and 1222 to form a second tab portion 1224. In this example, first tab portion 1214 and second tab portion 1224 are located on opposing ends of braided lay-up 1110, as orientated along longitudinal axis 912.

Figure 13:
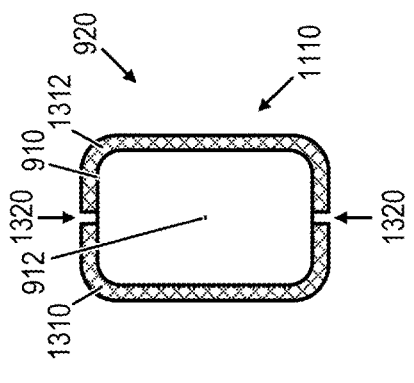
FIG. 13 depicts the braided lay-up of FIG. 11 and the braiding mandrel of FIG. 9 as viewed within a section that is orthogonal to the longitudinal axis.

FIG. 13 depicts braided lay-up 1110 and braiding mandrel 910 as viewed within section 920 that is orthogonal to longitudinal axis 912. In this example, braided lay-up 1110 is cut into a first portion 1310 and a second portion 1312 along a path indicated by arrows 1320. First portion 1310 of braided lay-up 1110 is also identified in FIG. 12 for reference. As previously described, cutting a braided lay-up into two or more portions enables the braided lay-up or portions thereof to be removed from the braiding mandrel. Additionally, the two or more portions of the braided lay-up may form respective composite articles, such as a pair of structural ribs for an aeronautical vehicle, as an example. In this example, a right structural rib for a right side of the aeronautical vehicle and a left structural rib for a left side of the aeronautical vehicle may be formed on a common braiding mandrel.

Figure 14:
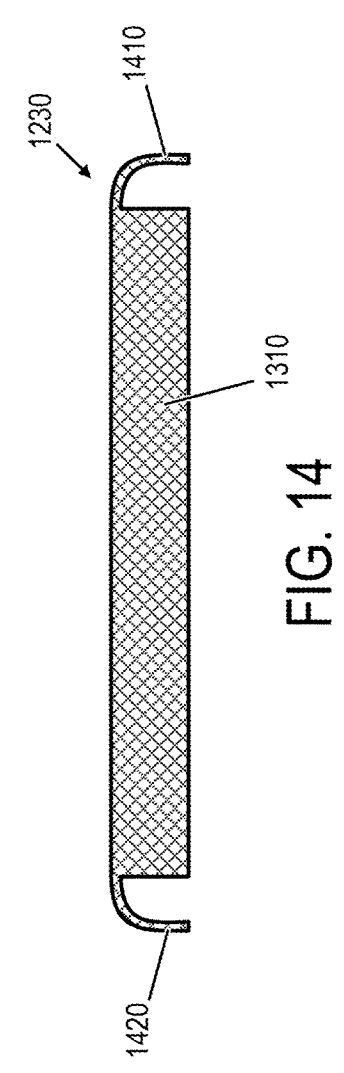
FIG. 14 depicts a first portion of the braided lay-up of FIG. 11 removed from the braiding mandrel of FIG. 9.

FIG. 14 depicts first portion 1310 of braided lay-up 1110 removed from braiding mandrel 910. A side view 1230 of first portion 1310 identified by an arrow in FIG. 12 is depicted in FIG. 14. In this example, accessory structures that include flanges 1410 and 1420 are formed from tab portions 1214 and 1224 of braided lay-up 1110. As an example, tab portion 1214 may be folded or bent at room temperature into a shape represented schematically in FIG. 14 by flange 1410. Flange 1410 may be secured by tack welding two or more braided layers of braided lay-up 1110 to retain the shape shown in FIG. 14 for subsequent consolidation. Similarly, flange 1420 may be secured by tack welding two or more braided layers of braided lay-up 1110 to retain the shape shown in FIG. 14 for subsequent consolidation. Second portion 1312 may be similarly processed to form and secure any accessory structures from features of the braided lay-up.

Figure 15:
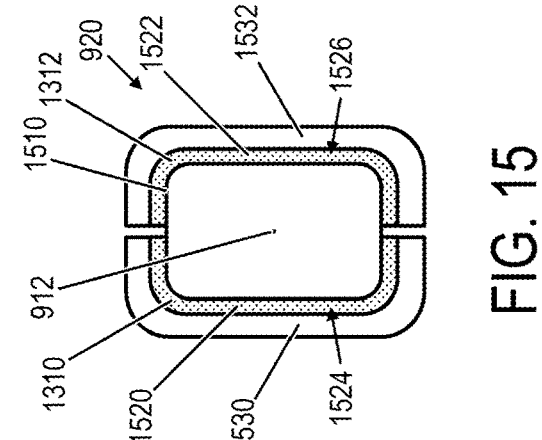
FIG. 15 depicts the first portion and a second portion of the braided lay-up of FIG. 11 loaded onto a consolidation mandrel.

FIG. 15 depicts first portion 1310 and second portion 1312 loaded onto a consolidation mandrel 1510, as viewed within section 920. In this example, first portion 1310 refers to a first preform 1520, and second portion 1312 refers to a second preform 1522. A first cover portion 1530 may be used to retain and compress first preform 1520 onto consolidation mandrel 1510 during heating and consolidation. Similarly, a second cover portion 1532 may be used to retain and compress preform 1522 onto consolidation mandrel 1510 during heating and consolidation. In at least some examples, consolidation mandrel 1510 and/or cover portions 1530 and 1532 may take the form of one or more aluminum pressure bladders that are inflated to support the preforms during consolidation. It will be understood that a preform can be compressed during heating and consolidation using other suitable techniques.

As previously described, compressing a preform during heating and consolidation can reduce the bulk of the preform and resulting consolidated form by decreasing or eliminating volumetric regions of free air space or voids within individual braided layers and/or between the braided layers. In the disclosed examples where braided layers of a preform include thermoplastic resin thread braided with fiber-reinforced thermoplastic resin tape, compressing the preform can reduce undulation of fibers within the braided layers due to displacement of resin contained in the thread. This displacement of resin enables segments of the fibers overlapping the thread within the braid to displace into regions previously occupied by the thread. In such examples, an increase in the displacement of the fibers during the consolidation process can be achieved by braiding with thermoplastic resin thread as compared to braiding with fiber-reinforced materials, thereby resulting in a greater reduction in undulation of the fibers within the consolidated form.

In the disclosed examples where braided layers of a preform are formed by metallic thread braided with fiber-reinforced thermoplastic resin tape, compressing the preform following removal of the metallic thread can reduce undulation of fibers within the braided layers due to displacement of the fibers into regions previously occupied by the metallic thread. In such examples, an increase in the displacement of the fibers during the consolidation process can be achieved by braiding with metallic thread that is removed prior to consolidation as compared to fiber-reinforced materials that remain within the consolidated form, thereby resulting in a greater reduction in undulation of the fibers within the consolidated form.

Further, the disclosure comprises configurations and approaches according to the following clauses.

A.1. A method of manufacturing a composite article, the method comprising: forming one or more braided layers around a braiding mandrel along at least a portion of a longitudinal axis of the braiding mandrel by: for each braided layer, braiding tape segments of a fiber-reinforced thermoplastic resin tape applied at a tape tow orientation with thread segments applied at a thread tow orientation that is biased at an angle relative to the tape tow orientation.

A.2. The method of clause A.1, wherein the thread segments of each of the one or more braided layers include a thermoplastic resin thread; wherein the method further comprises heating a preform that includes at least a portion of the one or more braided layers to obtain a consolidated form; and wherein the thermoplastic resin thread present in the preform is integrated into the consolidated form.

A.3. The method of clause A.1, wherein the thread segments of each of the one or more braided layers include a metallic thread; and wherein the method further comprises: heating a preform that includes at least a portion of the one or more braided layers to obtain a consolidated form; and removing the metallic thread from the preform prior to consolidation of the preform to the consolidated form.

A.4. The method of clause A.1, wherein for a first braided layer of the one or more braided layers, the tape tow orientation is parallel to the longitudinal axis of the braiding mandrel.

A.5. The method of clause A.4, wherein for the first braided layer: the thread tow orientation of a first subset of the thread segments is biased in a first angular direction relative to the tape tow orientation; and the thread tow orientation of a second subset of the thread segments is biased in a second angular direction relative to the tape tow orientation that is opposite the first angular direction.

A.6. The method of clause A.1, wherein for a first braided layer of the one or more braided layers, the tape tow orientation is biased at an angle relative to the longitudinal axis of the braiding mandrel.

A.7. The method of clause A.1, wherein the one or more braided layers include a plurality of braided layers; wherein the tape tow orientation of a first braided layer of the plurality of braided layers is biased at an angle relative to the tape tow orientation of a second braided layer of the plurality of braided layers.

A.8. The method of clause A.7, further comprising: tack welding second braided layer to the first braided layer.

A.9. The method of clause A.7, further comprising: heating a preform that includes at least a portion of the first braided layer and the second braided layer to obtain a consolidated form.

A.10. The method of clause A.7, wherein the plurality of braided layers includes a third braided layer; wherein the tape tow orientation of the third braided layer is biased at an angle relative to the tape tow orientation of the first braided layer and relative to the tape tow orientation of the second braided layer.

B.1. A method of manufacturing a composite article, the method comprising: forming a plurality of braided layers around a braiding mandrel along at least a portion of a longitudinal axis of the braiding mandrel by: for each braided layer of the plurality of braided layers, braiding tape segments of a fiber-reinforced thermoplastic resin tape applied at a tape tow orientation with thread segments of a thermoplastic resin thread applied at a thread tow orientation that is biased at an angle relative to the tape tow orientation; and heating and compressing a preform that includes at least a portion of the one or more braided layers to obtain a consolidated form; wherein the thermoplastic resin thread present in the preform is integrated into the consolidated form.

B.2. The method of clause B.1, wherein the tape tow orientation of a first braided layer of the plurality of braided layers is biased at an angle relative to the tape tow orientation of a second braided layer of the plurality of braided layers.

B.3. The method of clause B.2, wherein the tape tow orientation of the first braided layer is parallel to the longitudinal axis of the braiding mandrel; and wherein the tape tow orientation of the second braided layer is biased at an angle relative to the longitudinal axis of the braiding mandrel.

B.4. The method of clause B.3, wherein the tape tow angle of a third braided layer of the plurality of braided layers is biased at an angle relative to the longitudinal axis of the braiding mandrel in an opposite angular direction as the tape tow angle of the second braided layer.

C.1. A method of manufacturing a composite article, the method comprising: forming a plurality of braided layers around a braiding mandrel along at least a portion of a longitudinal axis of the braiding mandrel by: for each braided layer of the plurality of braided layers, braiding tape segments of a fiber-reinforced thermoplastic resin tape applied at a tape tow orientation with thread segments of a thermoplastic resin thread applied at a thread tow orientation that is biased at an angle relative to the tape tow orientation; tack welding a braided layer of the plurality of braided layers to another braided layer of the plurality of braided layers to stabilize the braided lay-up; cutting the braided lay-up into two or more portions; and heating and compressing a preform that includes a portion of the braided lay-up to obtain a consolidated form; wherein the thermoplastic resin thread present in the preform is integrated into the consolidated form.

C.2. The method of clause C.1, wherein the composite article takes the form of a structural rib of an aeronautical vehicle.

C.3. The method of clause C.1, further comprising: heating another preform that includes another portion of the braided lay-up on the consolidation mandrel.

C.4. The method of clause C.1, wherein the tape tow orientation of a first braided layer of the plurality of braided layers is biased at an angle relative to the tape tow orientation of a second braided layer of the plurality of braided layers.

C.5. The method of clause C.4, wherein the tape tow orientation of a third braided layer of the plurality of braided layers is biased at an angle relative to the tape tow orientation of the second braided layer of the plurality of braided layers.

C.6. The method of clause C.5, wherein the tape tow orientation of the third braided layer is biased at an angle relative to the tape tow orientation of the first braided layer.

It will be understood that the configurations and/or approaches described herein are exemplary in nature, and that these specific examples are not to be considered in a limiting sense, because numerous variations are possible. The specific methods and operations described herein may represent one or more of any number of processing techniques. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various configurations, approaches, methods, operations, and other features, functions, acts, and/or properties disclosed herein, as well as any and all equivalents thereof.

The invention claimed is:

1. A method of manufacturing a composite article, the method comprising:

forming one or more braided layers around a braiding mandrel along at least a portion of a longitudinal axis of the braiding mandrel by:

for each braided layer of the one or more braided layers, braiding tape segments of a fiber-reinforced thermoplastic resin tape applied at a tape tow orientation with thread segments applied at a thread tow orientation that is biased at an angle relative to the tape tow orientation;

wherein each of the thread segments take the form of a single filament thread or a multi-filament thread; and wherein for a braided layer of the one or more braided layers, the thread tow orientation is biased at an angle relative to the longitudinal axis.

2. The method of claim 1, wherein the thread segments of each of the one or more braided layers include a thermoplastic resin thread;

wherein the method further comprises heating a preform that includes at least a portion of the one or more braided layers to obtain a consolidated form; and wherein the thermoplastic resin thread present in the preform is integrated into the consolidated form.

3. The method of claim 1, wherein the thread segments of each of the one or more braided layers include a metallic thread; and wherein the method further comprises:

heating a preform that includes at least a portion of the one or more braided layers to obtain a consolidated form; and removing the metallic thread from the preform prior to consolidation of the preform to the consolidated form.

4. The method of claim 1, wherein for a first braided layer of the one or more braided layers, the tape tow orientation is parallel to the longitudinal axis of the braiding mandrel.

5. The method of claim 4, wherein for the first braided layer:

the thread tow orientation of a first subset of the thread segments is biased in a first angular direction relative to the tape tow orientation; and the thread tow orientation of a second subset of the thread segments is biased in a second angular direction relative to the tape tow orientation that is opposite the first angular direction.

6. The method of claim 1, wherein for a first braided layer of the one or more braided layers, the tape tow orientation is biased at an angle relative to the longitudinal axis of the braiding mandrel.

7. The method of claim 1, wherein the one or more braided layers include a plurality of braided layers;

wherein the tape tow orientation of a first braided layer of the plurality of braided layers is biased at an angle relative to the tape tow orientation of a second braided layer of the plurality of braided layers.

8. The method of claim 7, further comprising:

tack welding the second braided layer to the first braided layer.

9. The method of claim 7, further comprising:

heating a preform that includes at least a portion of the first braided layer and the second braided layer to obtain a consolidated form.

10. The method of claim 7, wherein the plurality of braided layers includes a third braided layer;

wherein the tape tow orientation of the third braided layer is biased at an angle relative to the tape tow orientation of the first braided layer and relative to the tape tow orientation of the second braided layer.

11. A method of manufacturing a composite article, the method comprising:

forming a plurality of braided layers around a braiding mandrel along at least a portion of a longitudinal axis of the braiding mandrel by:

for each braided layer of the plurality of braided layers, braiding tape segments of a fiber-reinforced thermoplastic resin tape applied at a tape tow orientation with thread segments of a thermoplastic resin thread applied at a thread tow orientation that is biased at an angle relative to the tape tow orientation, wherein the thread segments of the thermoplastic resin thread each take the form of a single filament thread or a multi-filament thread of thermoplastic resin, and wherein for a braided layer of the plurality of braided layers, the thread tow orientation is biased at an angle relative to the longitudinal axis; and heating and compressing a preform that includes at least a portion of the plurality of braided layers to obtain a consolidated form;

wherein the thermoplastic resin thread present in the preform is integrated into the consolidated form.

12. The method of claim 11, wherein the tape tow orientation of a first braided layer of the plurality of braided layers is biased at an angle relative to the tape tow orientation of a second braided layer of the plurality of braided layers.

13. The method of claim 12, wherein the tape tow orientation of the first braided layer is parallel to the longitudinal axis of the braiding mandrel; and wherein the tape tow orientation of the second braided layer is biased at an angle relative to the longitudinal axis of the braiding mandrel.

14. The method of claim 13, wherein the tape tow orientation of a third braided layer of the plurality of braided layers is biased at an angle relative to the longitudinal axis of the braiding mandrel in an opposite angular direction as the tape tow orientation of the second braided layer.

15. A method of manufacturing a composite article, the method comprising:

forming a plurality of braided layers around a braiding mandrel along at least a portion of a longitudinal axis of the braiding mandrel by:

for each braided layer of the plurality of braided layers, braiding tape segments of a fiber-reinforced thermoplastic resin tape applied at a tape tow orientation with thread segments of a thermoplastic resin thread applied at a thread tow orientation that is biased at an angle relative to the tape tow orientation, wherein the thread segments of the thermoplastic resin thread each take the form of a single filament thread or a multi-filament thread of thermoplastic resin, and wherein for a braided layer of the plurality of braided layers, the thread tow orientation is biased at an angle relative to the longitudinal axis;

tack welding a braided layer of the plurality of braided layers to another braided layer of the plurality of braided layers to stabilize a braided lay-up formed by the plurality of braided layers;

cutting the braided lay-up into two or more portions; and heating and compressing a preform that includes a portion of the braided lay-up to obtain a consolidated form;

wherein the thermoplastic resin thread present in the preform is integrated into the consolidated form.

16. The method of claim 15, wherein the composite article takes the form of a structural rib of an aeronautical vehicle.

17. The method of claim 15, further comprising: heating another preform that includes another portion of the braided lay-up on the consolidation mandrel.

18. The method of claim 15, wherein the tape tow orientation of a first braided layer of the plurality of braided layers is biased at an angle relative to the tape tow orientation of a second braided layer of the plurality of braided layers.

19. The method of claim 18, wherein the tape tow orientation of a third braided layer of the plurality of braided layers is biased at an angle relative to the tape tow orientation of the second braided layer of the plurality of braided layers; and wherein the thread tow orientation of the third braided layer is biased at an angle relative to the thread tow orientation of the second braided layer.

20. The method of claim 19, wherein the tape tow orientation of the third braided layer is biased at an angle relative to the tape tow orientation of the first braided layer.

* * * * *